Nov. 29, 1966          D. TAUB ET AL          3,289,056
CAPACITOR WITH DIRECT TRAVEL MECHANISM
Filed May 25, 1965                                              2 Sheets-Sheet 1
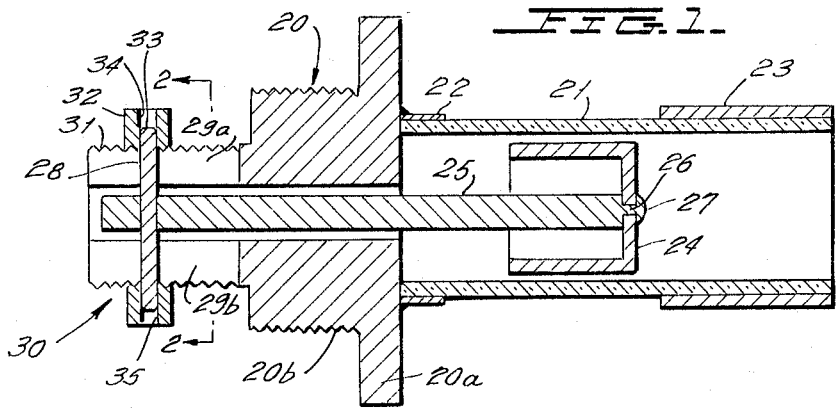
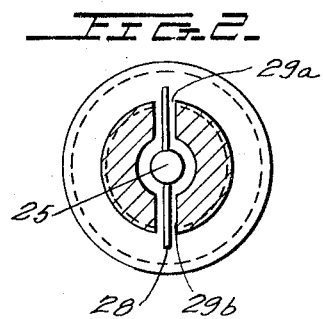
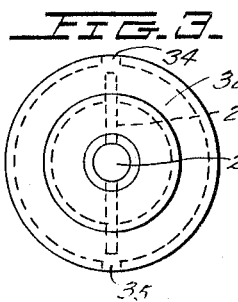
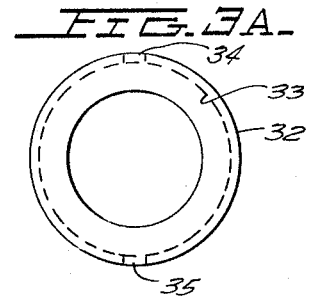
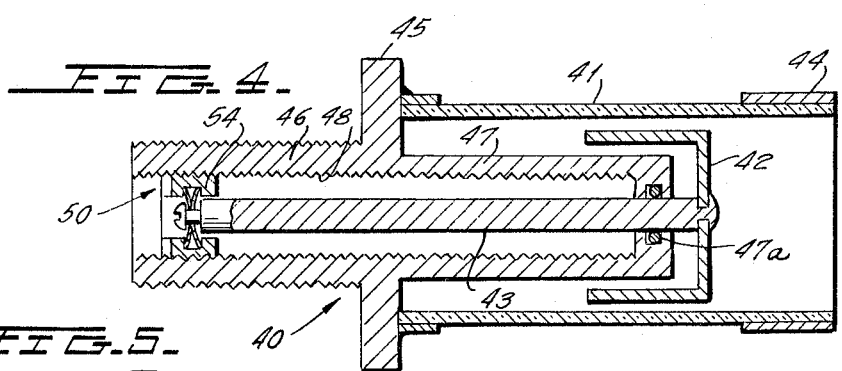
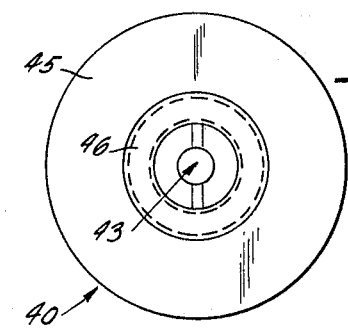
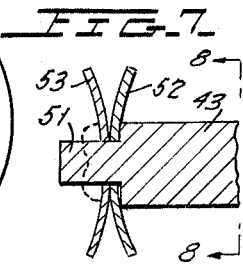
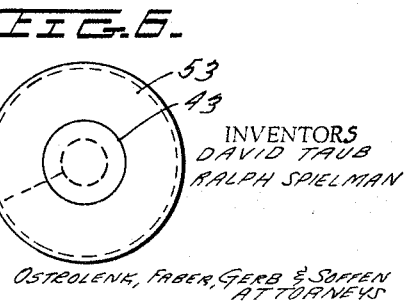
INVENTORS
DAVID TAUB
RALPH SPIELMAN
OSTROLENK, FABER, GERB & SOFFEN
ATTORNEYS

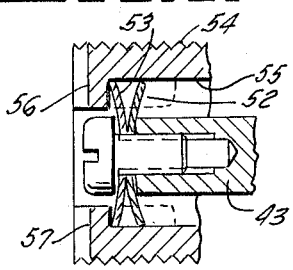
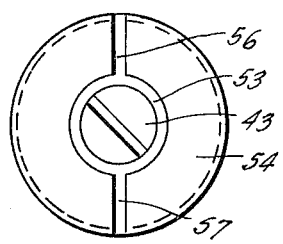
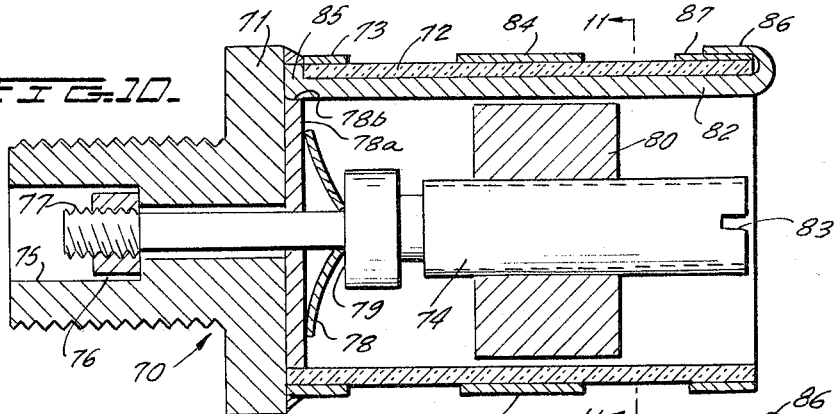
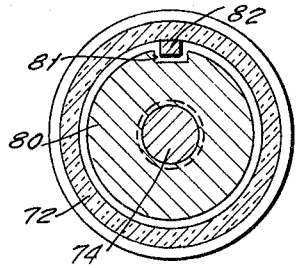
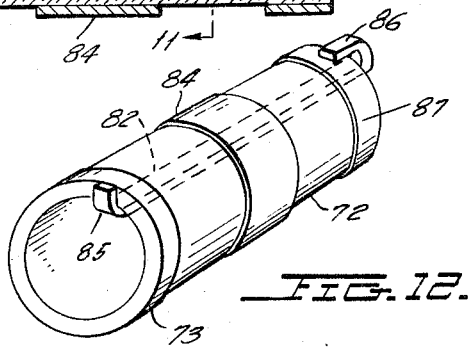
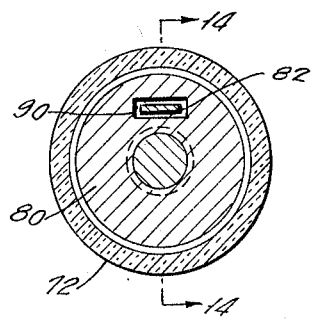
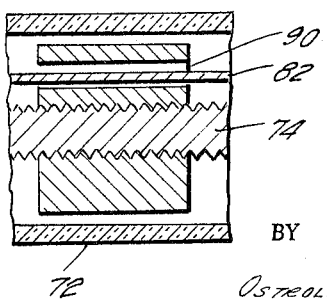
INVENTORS
DAVID TAUB
RALPH SPIELMAN
BY
OSTROLENK, FABER, GERB & SOFFEN
ATTORNEYS

United States Patent Office 3,289,056
Patented Nov. 29, 1966

3,289,056
CAPACITOR WITH DIRECT TRAVEL MECHANISM
David Taub, Paris, France, and Ralph Spielman, Brooklyn, N.Y., assignors to JFD Electronics Corporation, Brooklyn, N.Y., a corporation of New York
Filed May 25, 1965, Ser. No. 458,691
7 Claims. (Cl. 317—249)

This invention relates to direct travel mechanisms for trimmer capacitors, and more specifically relates to direct travel mechanisms of inexpensive construction.

Trimmer capacitors are generally well-known structures wherein a conductive piston moves within a dielectric cylinder having electrode bands thereon. The dielectric cylinder is then carried from a support bushing which also carries a suitable adjustment structure such as a screw. This adjustment structure then carries a piston and moves the piston axially along the interior of the dielectric cylinder, thus changing its spacing from the electrode band on the dielectric cylinder to vary capacitance between these two bodies.

It is desirable to prevent rotation of the piston during its axial movement and to cause the piston to move axially without rotation. The prevention of rotation of the piston prevents the occurrence of "reversals" or irregularities in the linearity curve between the motion of the adjustment mechanism and the capacitance of the device.

The present invention provides a novel and inexpensive direct travel mechanism wherein the piston rotation is prevented through the means of an inexpensive blocking arrangement. Thus, in a first embodiment of the invention, the adjustment shaft is provided with an extending pin means which is received by an external adjustment nut. The pin means rides in bushing slots whereupon rotation of the adjustment nut causes the axial movement of the adjustment shaft and thus, the piston, without rotation.

In accordance with a second embodiment of the invention, the adjustment shaft secured to the piston is again moved by a rotatable nut, where, however, rotation of the adjustment shaft and its piston are prevented by frictional forces existing between a portion of the bushing and the adjustment shaft.

In accordance with a further embodiment of the invention, a simple keying spring is provided directly on the piston to prevent rotation thereof.

Accordingly, a primary object of this invention is to provide an inexpensive mechanism for direct travel trimmer capacitors.

Another object of this invention is to provide a novel trimmer capacitor of the direct travel type in which adjustment of the piston position is achieved by rotation of a nut cooperating with the adjustment shaft.

A further object of this invention is to provide a novel direct travel mechanism for trimmer capacitors in which a novel spring arrangement serves as a keying shaft for the piston to prevent piston rotation.

These and other objects of this invention will become apparent from the following description when taken in connection with the drawings, in which:

FIGURE 1 is a side cross-sectional view of a trimmer capacitor constructed in accordance with a first embodiment of the invention.

FIGURE 2 is a cross-sectional view of FIGURE 1 taken across the lines 2—2 in FIGURE 1.

FIGURE 3 is an end plan view of FIGURE 1 taken from the left-hand side of FIGURE 1.

FIGURE 3a shows a front view of the adjustment nut of FIGURES 1 and 3.

FIGURE 4 is a side cross-sectional view of a trimmer capacitor manufactured in accordance with a second embodiment of the invention.

FIGURE 5 is a side plan view of FIGURE 4 as seen from the left-hand side of FIGURE 4.

FIGURE 6 is an elarged detail view of the sliding contact arrangement of FIGURE 5.

FIGURE 7 is a side plan view of FIGURE 6.

FIGURE 8 is a cross-sectional detail view of the assembly of the sliding contact of FIGURE 6 and the adjustment nut.

FIGURE 9 is a side view of FIGURE 8 as seen from the left-hand side of FIGURE 8.

FIGURE 10 is a side cross-sectional view of a trimmer capacitor constructed in accordance with a third embodiment of the invention.

FIGURE 11 is a side cross-sectional view of FIGURE 10 taken across the lines 11—11 in FIGURE 10.

FIGURE 12 is a perspective view of the dielectric cylinder of FIGURES 10 and 11 having a spring clip in position thereon.

FIGURE 13 illustrates one manner in which the arrangement of FIGURES 10 and 11 can be modified.

FIGURE 14 is a partial cross-sectional view of FIGURE 13 taken across the lines 14—14 of FIGURE 13.

Referring first to FIGURE 1, a typical trimmer capacitor which has a support bushing 20 has been illustrated therein. The support bushing may have a suitable mounting flange 20a and thread 20b for reception of a mounting nut (not shown). Support bushing 20 has a dielectric cylinder 21 secured thereto in any of the usual standards prior art techniques as by soldering from metallized band 22 to the face of bushing 20. The dielectric cylinder 21 then has an electrode band 23 thereon which cooperates with a conductive piston 24. The conductive piston 24 is then carried at the right-hand end of circular adjustment shaft 25. By way of example, the right-hand end of shaft 25 can have a reduced diameter portion 26 which extends through an opening in the bottom of piston 24 and is fastened by welding, soldering, or staking, etc. to serve as a securement head 27.

The left-hand end of adjustment shaft 25 then has a suitable opening therein which slidably receives a pin 28 which is thereafter rigidly fastened to shaft 25. Note that the extending pin 28 could be rigidly connected to shaft 25 in any manner.

The extending ends of pin 28 are then received in the slotted sections 29a and 29b of the left-handwardly extending bushing portion 30 of bushing 20. The exterior of portion 30 is then provided with a thread 31 which threadably carries an internally threaded adjustment nut 32. The internally threaded adjustment nut 32 then has a central annular groove 33 therein which receives the opposite ends of pin 28. By way of example, and as shown in FIGURE 3a, the nut 32 may have one or two radial holes 34 and 35 extending into groove 33 whereby pin 28 may be inserted through holes 34 or 35 to the interior of groove 33. One hole is all that is needed for assembly and two holes allow for disassembly. A knurl placed on nut 32 allows easy manual adjustment while a special tool with an internal spline allows remote tuning.

In operation, it will be apparent that rotation of adjustment nut 32 on thread 31 will cause the nut 32 to traverse along the axis of the device. This will cause pin 28 to traverse along the axis of the device with rotation of pin 28 being prevented by its being captured in slots 29a and 29b in bushing section 30.

Accordingly, the shaft 25, and thus piston 24, will move along the axis of dielectric cylinder 21 without rotation, thus achieving the desired result of the invention.

FIGURES 4 through 9 illustrate a second embodiment of the invention wherein FIGURE 4 illustrates a modified support bushing 40 which has a dielectric cylinder 41 secured thereto. A conductive piston 42 is then carried on the adjustment shaft 43 and moves with respect to the electrode band 44 on dielectric cylinder 41. The support bushing 40 of FIGURE 4 has an extending flange section 45 and mounting thread 46 in the usual manner. However, bushing 40 is provided with a rightwardly extending section 47 and an internal thread 48 which extends substantially through the entire bushing with the exception of the immediate right-hand end of extension 47. The right-hand end of extension 47 is then provided with a radially inwardly directed annular portion having a diameter slightly greater than the diameter of shaft 43. Moreover, this right-hand end of bushing portion 47 has an internal groove which receives an O-ring 47a which tightly grips the round exterior surface of adjustment shaft 43. An adjustment nut structure 50 is then threadably received by an interior thread 48 and is connected to shaft 43 to cause axial motion of shaft 43.

More specifically, and as best shown in FIGURE 6, the right-hand end of shaft 43 has a normally necked-down diameter portion 51 which has two spring washers 52 and 53 thereon with the end portion of shaft 43 thereafter being peened over, as illustrated in dotted lines in FIGURE 6, to capture springs 52 and 53 on the end of shaft 43. Thereafter, an externally threaded nut 54, as shown in FIGURE 8, has an internal opening 55 which receives the springs 52 and 53 on shaft 43. The right-hand portion of nut 54 is thereafter rolled over, as illustrated in the dotted lines in FIGURE 8, in order to capture springs 52 and 53 with the springs 52 and 53 forming a rotatable connection between nut 54 and shaft 43.

The nut 54 is then threadably received by the internal thread 48 of bushing 40, and is provided with suitable tool-receiving slots such as slots 56 and 57 which permit rotation of nut 54 in the thread 48.

In operation, and when nut 54 is rotated in FIGURE 4, the nut 54 will be caused to traverse axially with respect to bushing 40 and dielectric cylinder 41. The connection, however, between shaft 43 and bushing extension 47 by O-ring 47a is such that sufficient frictional force is provided to prevent rotation of shaft 43. Therefore, the springs 52 and 53 will permit relative rotation between nut 54 and shaft 43, whereupon the piston 42 will axially traverse with respect to electrode band 44 without rotating. Therefore, an extremely inexpensive direct travel mechanism is provided in FIGURE 4.

A still further embodiment of the invention is illustrated in FIGURES 10, 11 and 12 where FIGURE 10 illustrates a cross-sectional view of a direct travel-type trimmer capacitor constructed in accordance with the present invention. Thus, in FIGURE 10 a support bushing 70 having a suitable mounting flange 71 is connected to dielectric cylinder 72 in the usual manner as by soldering to a metallized band 73.

An adjustment screw 74 is then captured in the cavity 75 of bushing 70 as by a suitable locking nut 76 which threadably engages the threaded end 77 of adjustment shaft 74. Preferably, the locking nut 76 is staked to shaft 74 after a suitable adjustment position is achieved.

A pressure washer 78 is then connected between shoulder 79 of adjustment screw 74 and washer 78a bearing against bushing 70, whereby the right-hand side of nut 76 engages the interior of the interior wall of cavity 75 with a predetermined force thus adjusting the torque required to rotate screw 74. A solid conductive piston 80 having a threaded central opening therein is then threadably carried on adjustment screw 74.

As best shown in FIGURE 11, piston 80 has a slot 81 therein which receives an elongated spring 82 which is carried by dielectric cylinder 72 to serve as a means to prevent rotation of piston 80. Thus, in accordance with the invention, and as shown in FIGURES 10, 11 and 12, the adjustment screw 74 having a tool-receiving slot 83 may be rotated while maintaining a fixed axial position in view of its capture by nut 76 and spring 78. The piston 80, however, will be forced to traverse axially along adjustment screw 74, its rotation being prevented by the keying spring 82, whereupon piston 80 will move with respect to electrode band 84 on dielectric cylinder 72 without rotation.

The spring 82, as shown in FIGURES 10 and 12, is easily connected to the dielectric cylinder 72 as by causing spring 82 to have an upper projecting section 85 at its left-hand end which may be captured in a cooperating cut-out section 78b in flat washer 78a. The right-hand end of spring 82 is then provided with a re-entrant portion 86 which may be soldered or cemented to a metallized band 87 on dielectric cylinder 72. Thus, the assembly of the device is simple, and the apparatus is very inexpensive, thus leading to extremely inexpensive direct travel trimmer capacitor mechanism.

While the embodiment of FIGURES 10, 11 and 12 illustrates the spring 82 as entering a slot 81 in piston 80, this arrangement could be modified, as indicated in FIGURES 13 and 14, wherein the slot 81 of FIGURE 11 is replaced by an aperture 90 in piston 80 which receives the spring 82 which, in the embodiment of FIGURES 13 and 14, is downwardly spaced from the interior surface of dielectric cylinder 72. Note that in the embodiment of FIGURES 13 and 14, the spring 82 can further serve to hold the piston 80 into close contact with the upper interior surface of dielectric cylinder 72. Moreover, and with this design, there is no loss of capacity due to a slot in the piston diameter, or increase in minimum capacitance due to spring 82 (when conductive).

In both embodiments of FIGURES 10 through 14, the spring may be of conductive material such as brass or steel. However, the spring 82 may also be of a non-conductive material such as any suitable plastic which is cemented in position with respect to dielectric cylinder 72. By using a non-conductor for spring 82, the minimum capacitance obtainable from the device will be decreased.

Although this invention has been described with respect to its preferred embodiments, it should be understood that many variations and modifications will now be obvious to those skilled in the art, and it is preferred therefore that the scope of the invention be limited not by the specific disclosure herein but only by the appended claims.

The embodiments of the invention in which an exclusive privilege or property is claimed are defined as follows:

1. A trimmer capacitor comprising a support bushing having a central opening therethrough, an elongated dielectric cylinder secured to said support bushing and coaxial with said central opening, an electrode band on said dielectric cylinder, an elongated adjustment shaft extending through said opening, a piston within said dielectric cylinder and connected to one end of said adjustment shaft, an adjustment nut having an internal annular groove, and radially extending connection means connected to said elongated adjustment shaft and extending into said annular groove; said support bushing having a threaded surface, said adjustment nut having a threaded surface, said threaded surface of said adjustment nut being threaded onto said threaded surface of said support bushing; and rotation prevention means; said rotation prevention means connected between said elongated adjustment shaft and said support bushing; said rotation prevention means preventing rotation of said elongated adjustment shaft responsive to rotation of said adjustment nut.

2. The device substantially as set forth in claim 1 wherein said rotation prevention means includes an elongated slot in said support bushing; said radially extending connection means being disposed in said slot.

3. The device substantially as set forth in claim 1 wherein said rotation prevention means includes a friction ring; said friction ring being secured to and surrounding said elongated adjustment shaft; said friction ring extending radially outwardly and frictionally engaging the interior of said opening in said support bushing.

4. The device substantially as set forth in claim 1 wherein said threaded surface of said adjustment nut comprises an interior thread in an opening through said nut and said threaded surface of said support bushing comprises an exterior thread on the exterior surface of said support bushing; said support bushing having a slot therethrough; said radially extending connection means extending through said slot.

5. The device substantially as set forth in claim 1 wherein said threaded surface of said adjustment nut comprises an external thread; said threaded surface of said support bushing comprising a threaded portion in said central opening of said support bushing.

6. The device substantially as set forth in claim 3 wherein said threaded surface of said adjustment nut comprises an external thread; said threaded surface of said support bushing comprising a threaded portion in said central opening of said support bushing.

7. The device substantially as set forth in claim 3 wherein said radially extending connection means comprises a spring washer.

References Cited by the Examiner
UNITED STATES PATENTS

| | | | |
|---|---|---|---|
| 1,641,438 | 9/1927 | Jones | 317—249 |
| 2,059,816 | 11/1936 | Schwarzhaupt | 317—249 |

LEWIS H. MYERS, *Primary Examiner.*

LARAMIE E. ASKIN, *Examiner.*

E. GOLDBERG, *Assistant Examiner.*